US012315489B2

(12) United States Patent
Rose et al.

(10) Patent No.: US 12,315,489 B2
(45) Date of Patent: May 27, 2025

(54) AUTOMATIC VOICEOVER GENERATION

(71) Applicant: Google LLC, Mountain View, CA (US)

(72) Inventors: Nick Rose, Mountain View, CA (US); Brian Foster Allen, San Francisco, CA (US); Howard Mullings, Mountain View, CA (US); Ralph Leith, Mountain View, CA (US); Sheenam Maheshwari, Mountain View, CA (US)

(73) Assignee: Google LLC, Mountain View, CA (US)

( * ) Notice: Subject to any disclaimer, the term of this patent is extended or adjusted under 35 U.S.C. 154(b) by 208 days.

(21) Appl. No.: 17/444,663

(22) Filed: Aug. 7, 2021

(65) Prior Publication Data

US 2023/0040015 A1 Feb. 9, 2023

(51) Int. Cl.
*G10L 13/027* (2013.01)
*G10L 13/04* (2013.01)
*G10L 13/08* (2013.01)

(52) U.S. Cl.
CPC ............ *G10L 13/027* (2013.01); *G10L 13/04* (2013.01); *G10L 13/08* (2013.01)

(58) Field of Classification Search
CPC ....... G10L 13/00; G10L 13/02; G10L 13/027; G10L 13/033; G10L 13/0335; G10L 13/04; G10L 13/047; G10L 13/08; G10L 13/086; G10L 13/10; G06Q 30/02; G06Q 30/0241; G06Q 30/0243; G06Q 30/0276; G06Q 30/0251; G06Q 30/0255; G06Q 30/0269; G06Q 30/0271; G06F 40/56

(Continued)

(56) References Cited

U.S. PATENT DOCUMENTS

| | | | |
|---|---|---|---|
| 7,203,648 B1 * | 4/2007 | Ostermann | G10L 21/10 704/275 |
| 8,966,369 B2 | 2/2015 | Worthen | |

(Continued)

FOREIGN PATENT DOCUMENTS

WO   WO-2007108728 A2 *   9/2007   ............. G06F 17/27

OTHER PUBLICATIONS

International Search Report and Written Opinion for the related Application No. PCT/US2022/073975, dated Nov. 21, 2022, 20 pages.

(Continued)

*Primary Examiner* — Thierry L Pham
(74) *Attorney, Agent, or Firm* — Honigman LLP; Brett A. Krueger; Grant Griffith

(57) ABSTRACT

A method includes receiving a voice request to generate synthesized voiceover speech for a target advertisement having one or more advertising campaign attributes. The method also includes generating, based on the one or more advertising campaign attributes, a voiceover script that includes a sequence of text for the synthesized voiceover speech. The method also includes generating, using a text-to-speech (TTS) system, the synthesized voiceover speech. The TTS system is configured to receive, as input, the sequence of text for the voiceover script and generate, as output, the synthesized voiceover speech. Here, the synthesized voiceover speech has speech characteristics specified by a target TTS vertical. The method also includes overlaying the synthesized voiceover speech on the target advertisement.

20 Claims, 8 Drawing Sheets

(58) Field of Classification Search
 USPC .......................................................... 704/260
 See application file for complete search history.

(56) References Cited

U.S. PATENT DOCUMENTS

| | | | | |
|---|---|---|---|---|
| 10,930,263 | B1* | 2/2021 | Mahyar | G06N 3/088 |
| 2007/0271104 | A1 | 11/2007 | McKay | |
| 2008/0059189 | A1* | 3/2008 | Stephens | G10L 13/00 |
| | | | | 704/258 |
| 2008/0109845 | A1* | 5/2008 | Hengel | G06Q 30/02 |
| | | | | 725/36 |
| 2013/0124206 | A1* | 5/2013 | Rezvani | H04M 1/72439 |
| | | | | 704/270 |
| 2015/0143413 | A1 | 5/2015 | Hall et al. | |
| 2016/0092932 | A1* | 3/2016 | Bharath | G10L 13/00 |
| | | | | 705/14.67 |
| 2019/0279260 | A1* | 9/2019 | Carpita | G06Q 30/0269 |
| 2019/0355024 | A1* | 11/2019 | Han | G10L 21/013 |
| 2022/0138797 | A1* | 5/2022 | Wedel | G06Q 30/0261 |
| | | | | 705/14.5 |
| 2022/0405808 | A1* | 12/2022 | Khoury | G06Q 30/0203 |

OTHER PUBLICATIONS

RJ Skerry-Ryan et al: "Towards End-to-End Prosody Transfer for Expressive Speech Synthesis with Tacotron", arxiv.org, Cornell University Library, 201 Olin Library Cornell University Ithaca, NY 14853, Mar. 24, 2018 (Mar. 24, 2018), XP080862501, 11 pages.

* cited by examiner

AUTOMATIC VOICEOVER GENERATION

TECHNICAL FIELD

This disclosure relates to automatic voiceover generation.

BACKGROUND

Voiceover generation is the process of generating an audible voice for an audio or video advertising campaign that explains and/or provides additional context for a viewer of the advertising campaign. Voiceover generation has increased in popularity in recent years because adding voiceover to advertising campaigns has proven to greatly increase the effectiveness of the advertising campaigns. A key aspect of voiceover generation is what to say during the voiceover and how it should sound to appeal to a target customer that views the advertising campaign. However, determining what to say and how to say it is a significant undertaking for many companies and advertising agencies because of the time consuming and costly processes involved in hiring appropriate voice actors to speak the voice over audio for use in advertising campaigns.

SUMMARY

One aspect of the disclosure provides a computer-implemented method that when executed on data processing hardware causes the data processing hardware to perform operations. The operations include receiving a voiceover request to generate synthesized voiceover speech for a target advertisement having one or more advertising campaign attributes. The operations also include generating, based on the one or more advertising campaign attributes, a voiceover script that includes a sequence of text for the synthesized voiceover speech. The operations also include generating, using a text-to-speech (TTS) system, the synthesized voiceover speech. The TTS system is configured to receive, as input, the sequence of text for the voiceover script and generate, as output, the synthesized voiceover speech having speech characteristics specified by a target TTS vertical. The operations also include overlaying the synthesized voiceover speech on the target advertisement.

Implementations of the disclosure may include one or more of the following optional features. In some implementations, the operations further include selecting the target TTS vertical based on the one or more advertising campaign attributes. The speech characteristics specified by the target TTS vertical may include at least one of an utterance embedding that specifies prosody/style information conveyed by the synthesized voiceover speech, and a speaker embedding that specifies voice characteristics of the synthesized voiceover speech.

Optionally, the advertising campaign attributes may include at least one of a headline, a call to action, a geographic region, a language, or an audience demographic. In some examples, the sequence of text of the voiceover script includes one or more words and overlaying the synthesized voiceover speech on the target advertisement includes: determining a respective timestamp where the one or more words of the voiceover script should be spoken by the synthesized voiceover speech where the target advertisement has a playtime that includes the respective timestamp; and aligning the synthesized voiceover speech with the target advertisement such that a segment of the synthesized voiceover speech that corresponds to the one or more words of the voiceover script occurs at the respective timestamp of the target advertisement.

In some implementations, generating the voiceover script for the synthesized voiceover speech may include identifying one or more words related to an advertisement campaign that has the one or more advertising campaign attributes by identifying phrases from a landing page uniform resource locator (URL) associated with the advertising campaign and ranking each of the phrases identified from the landing page URL. The rank for each of the phrases corresponds to a likelihood that the respective phrase relates to the one or more advertisement campaign attributes of the advertising campaign. Here, the operations may further include determining whether the rank of any identified phrases satisfies a threshold value. Generating the voiceover script may occur when the rank of one of the identified phrases satisfies the threshold value and the sequence of text of the voiceover script represents the identified phrase that satisfies the threshold value.

In these implementations, in response to determining the rank of the identified phrases fail to satisfy the threshold value, the operations further include: accessing a corpus of advertisements associated with different advertising campaigns, each advertisement associated with a respective advertisement campaign that has a respective voiceover script and a set of advertising campaign attributes; identifying one or more advertisements from the corpus of advertisements that has advertising campaign attributes similar to the one or more advertising campaign attributes of the voiceover request; and generating the voiceover script for the synthesized voiceover speech based on the respective voiceover script of the identified one or more advertisements that have advertisement campaign attributes similar to the one or more advertising campaign attributes of the voiceover request.

In some examples, the TTS system includes a TTS model configured to convert the sequence of text for the voiceover script into a corresponding synthesized speech representation of the voiceover script and a TTS synthesizer configured to generate the synthesized voiceover speech from the synthesized speech representation output from the TTS model. Optionally, the one or more advertising campaign attributes may be associated with a human-made advertising campaign.

Another aspect of the disclosure provides a system that includes data processing hardware and memory hardware storing instructions that when executed on the data processing hardware cause the data processing hardware to perform operations. The operations include, receiving a voiceover request to generate synthesized voiceover speech for a target advertisement having one or more advertising campaign attributes. The operations also include generating, based on the one or more advertising campaign attributes, a voiceover script that includes a sequence of text for the synthesized voiceover speech. The operations also include generating, using a text-to-speech (TTS) system, the synthesized voiceover speech. The TTS system is configured to receive, as input, the sequence of text for the voiceover script and generate, as output, the synthesized voiceover speech having speech characteristics specified by a target TTS vertical. The operations also include overlaying the synthesized voiceover speech on the target advertisement.

Implementations of the disclosure may include one or more of the following optional features. In some implementations, the operations further include selecting the target TTS vertical based on the one or more advertising campaign attributes. The speech characteristics specified by the target TTS vertical may include at least one of an utterance embedding that specifies prosody/style information conveyed by the synthesized voiceover speech, and a speaker embedding that specifies voice characteristics of the synthesized voiceover speech.

Optionally, the advertising campaign attributes may include at least one of a headline, a call to action, a geographic region, a language, or an audience demographic. In some examples, the sequence of text of the voiceover script includes one or more words and overlaying the synthesized voiceover speech on the target advertisement includes: determining a respective timestamp where the one or more words of the voiceover script should be spoken by the synthesized voiceover speech where the target advertisement has a playtime that includes the respective timestamp; and aligning the synthesized voiceover speech with the target advertisement such that a segment of the synthesized voiceover speech that corresponds to the one or more words of the voiceover script occurs at the respective timestamp of the target advertisement.

In some implementations, generating the voiceover script for the synthesized voiceover speech may include identifying one or more words related to an advertisement campaign that has the one or more advertising campaign attributes by identifying phrases from a landing page uniform resource locator (URL) associated with the advertising campaign and ranking each of the phrases identified from the landing page URL. The rank for each of the phrases corresponds to a likelihood that the respective phrase relates to the one or more advertisement campaign attributes of the advertising campaign. Here, the operations may further include determining whether the rank of any identified phrases satisfies a threshold value. Generating the voiceover script may occur when the rank of one of the identified phrases satisfies the threshold value and the sequence of text of the voiceover script represents the identified phrase that satisfies the threshold value.

In these implementations, in response to determining the rank of the identified phrases fail to satisfy the threshold value, the operations further include: accessing a corpus of advertisements associated with different advertising campaigns, each advertisement associated with a respective advertisement campaign that has a respective voiceover script and a set of advertising campaign attributes; identifying one or more advertisements from the corpus of advertisements that has advertising campaign attributes similar to the one or more advertising campaign attributes of the voiceover request; and generating the voiceover script for the synthesized voiceover speech based on the respective voiceover script of the identified one or more advertisements that have advertisement campaign attributes similar to the one or more advertising campaign attributes of the voiceover request.

In some examples, the TTS system includes a TTS model configured to convert the sequence of text for the voiceover script into a corresponding synthesized speech representation of the voiceover script and a TTS synthesizer configured to generate the synthesized voiceover speech from the synthesized speech representation output from the TTS model. Optionally, the one or more advertising campaign attributes may be associated with a human-made advertising campaign.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
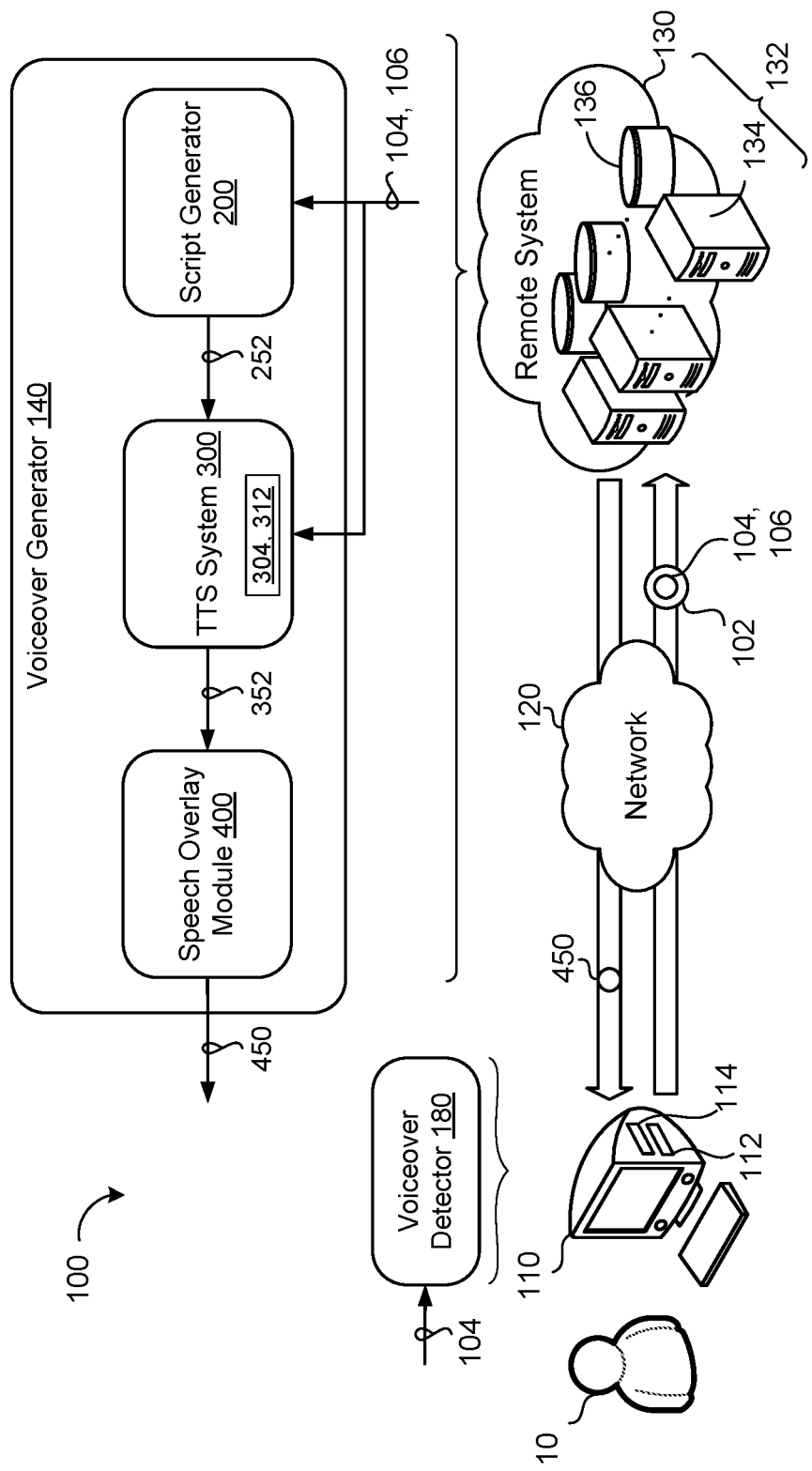
FIG. 1 is a schematic view of an example system for automatic voiceover generation.

An advertising campaign generally refers to an advertising strategy designed to promote brand awareness, increase sales, and/or improve communication within one or more markets. An advertising campaign often includes goals or objectives centered around a brand or a product. Some objectives include acquiring or expanding clientele, promoting current products, and/or launching new products. The design or strategy of the advertising campaign may also seek to associate a particular emotion or feeling with a brand or product. For instance, a new toy may be marketed in an advertising campaign to be fun, exciting, and playful while a new female workboot may be marketed as rugged, outdoorsy, practical, and generally emanate strength. In this sense, an advertising campaign includes one or more attributes that characterize the strategy of the advertising campaign. These attributes may designate properties of the advertising campaign such as a target audience (e.g., demographic details such as age, sex, social class, marital status, education level, interests, habits, and/or hobbies), a type of advertising content (e.g., a static advertisement such as a picture or image or a dynamic advertisement such as a video), a substance of one or more advertisements associated with the advertisement campaign (i.e., the content of the advertisement), a form-factor of an advertisement (e.g., an embedded video in an advertisement perimeter of a webpage versus a commercial within primary content), metric(s) for the advertising campaign, and/or information related to where the advertising content should be placed/hosted.

As digital marketing continues to expand, advertising campaigns have become more sophisticated to understand the social engineering of advertisements. With this understanding, it has been observed that advertising campaigns that include well-crafted (i.e., scripted) audio in their advertisements generally have a greater effectiveness with their target audience when compared to an advertisement without audio content. Therefore, advertising campaigns often try to include the production technique of voiceover to associate a voice or narrative with media content, especially media content that lacks an audible voice. In this respect, advertising agencies and entities operating advertising campaigns are increasingly seeking to add voiceover to advertisements associated with advertising campaigns.

Unfortunately, for voiceover to be effective for an advertising campaign, the voiceover needs to adequately describe the product, service, or company of the advertising campaign in a voice that is representative of a target consumer.

In other words, a voiceover should reflect the purposes, goals, objectives, and/or attributes associated with an advertising campaign for a particular product or brand. Therefore, the voiceover generation process may typically include multiple iterations to generate a voiceover script that is thoughtfully tailored to (or adequately describes) the advertising campaign. With a curated voiceover script, a voice for the voiceover is then used to represent key characteristics of the advertising campaign. That is, the voice for the voiceover is selected to have a prosody/speaking style (e.g., intonation, pitch, cadence, etc.) that corresponds to one or more characteristics of the advertising campaign. For example, returning to the workboot advertisement, to emanate strength, a female voice actor may be chosen who speaks with a speaking style/prosody indicative of a slow, deliberate, and confident speaking cadence.

Furthermore, if an advertising campaign for a product spans multiple regions or countries, different voice actors/actresses may be necessary to have the voice characteristics that represent the advertising campaign. The workboot advertisement aired in the United States may include a voiceover script spoken with voice characteristics as someone in the United States (i.e., American English) would speak, while the advertising campaign for the same product aired in England may include a voiceover script spoken with voice characteristics as someone in England (i.e., British English) would speak. This means that voiceover scripts may be spoken with voice characteristics that represent different languages, different genders, and/or different accents/dialects as needed to target a consumer of the advertising campaign. Due to these various demands by advertising campaigns, generating voiceover to effectively target an audience can quickly become complicated and costly in terms of voiceover script generation and voiceover generation from the voiceover script. For example, an advertising campaign that spans multiple countries demands voiceover scripts in multiple languages and multiple voiceover actors/actresses that speak the particular language.

Some current approaches seek to address these issues of voiceover generation by synthesizing the voiceover for advertising campaigns. Using synthesized speech has the advantage of not relying on a human voice actor to provide the voiceover speech. However, these current approaches do not base the voice characteristics of the synthesized speech based on attributes of the advertising campaign. That is, current voiceover approaches do not use a speech synthesizer to produce synthesized speech according to speech characteristics that specifically represent one or more attributes of the advertising campaign. Moreover, even when current approaches generate synthetic speech without speech characteristics specific to the advertising campaign, these implementations generally rely on receiving a voiceover script or speech transcript to produce the synthesized speech. Stated differently, the voiceover script is not automatically generated (i.e., machine/computer-generated), but rather produced by advertising professionals or an entity associated with a brand or a product (i.e., human-generated). This means that, even when using synthesized speech, voiceover script generation may still cause a bottleneck in the overall voiceover generation process.

Implementations herein are directed towards a method of automatic voiceover generation. The method executes a voiceover generation model that receives a voiceover request to generate synthesized voiceover speech for a target advertisement that has one or more advertising campaign attributes. The advertising campaign attributes may be computer-generated or provided by the user of the voiceover request. These campaign attributes provide context to the voiceover generation model in terms of what to say for the voiceover script and how to say it. The voiceover generation model generates a voiceover script for conversion into the synthesized voiceover speech having speech characteristics of the one or more advertising campaign attributes. That is, the voiceover generation model generates the voiceover script and determines the speech characteristics that the resulting synthesized voiceover speech should convey in order to specifically target an intended group of consumers based on the advertising campaign attributes. The voiceover generation model then overlays the synthesized voiceover speech onto the target advertisement. An entity administering the advertising campaign (e.g., the entity that generates the voiceover request) may then deploy the target advertisement with the overlain synthesized voiceover speech to the target audience. As used herein, the voiceover request may include an explicit request from a user to generate voiceover script for conversion into synthesized voiceovers speech for inclusion in a target advertisement, or a computing device may automatically generate the voiceover request upon detecting that a particular target advertisement does not include voiceover speech.

Referring now to FIG. 1, in some implementations, an example system 100 includes one or more user devices 110 in communication with a remote system 130 via a network 130. The user device 110 may correspond to any computing device, such as a desktop workstation, a laptop workstation, or a mobile device (i.e., smart phone). The user device 110 includes computing resources 112 (e.g., data processing hardware) and/or storage resources 114 (e.g., memory hardware). The remote system 130 is configured to receive a voiceover request 102 from the user device 110 associated with a respective user 10 via the network 120. The remote system 130 may be multiple computers or a distributed system (e.g., a cloud environment) having scalable/elastic resources 134 including computing resources 134 (e.g., data processing hardware) and/or storage resources 136 (e.g., memory hardware).

The voiceover request 102 requests that a voiceover generator 140 generates synthesized voiceover speech 352 for a target advertisement 104. Here, the synthesized voiceover speech 352 refers to machine-generated speech generated from a voiceover script that is overlain on media content (e.g., the target advertisement 104) as audio. The target advertisement 104 may be an audio advertisement or a video advertisement that does not include any voiceover or only includes voiceover for a portion of the target advertisement 104. While examples herein are directed toward automatically generating synthesized voiceover speech 352 to be overlain on a target advertisement, implementations herein are equally applicable to automatically generating synthesized voice over speech 352 to other types of media content, such as, without limitation, documentaries, musical performances, and educational videos to name a few. The target advertisement 104 is associated with an advertising campaign that has one or more advertising campaign attributes 106 such that these advertising campaign attributes 106 are imputed to the target advertisement 104. The advertising campaign attributes 106 may provide context for the target advertisement 104 and the target consumer (i.e., target audience) of the target advertisement 104. Accordingly, the voiceover generation model 140 generates the synthesized voiceover speech 352 based on the one or more advertising campaign attributes 106. In some examples, the user device 110 or the remote system 130 executes a voiceover detector 180 configured to detect whether a target advertisement 104

(i.e., audio-video data) includes voiceover speech. In these examples, the voiceover detector 180 may output an indication when voiceover speech/content is not detect (e.g., absent) from a target advertisement 104. The output indication may serve as a suggestion prompting the user 10 to provide the voiceover request 102 to the voiceover generation model 140. Alternatively, the voiceover detector 180 may automatically generate and provide the voiceover request 102 to the voiceover generator 140 to request the voiceover generator 140 to generate the synthesized voiceover speech 352 for the target advertisement 104.

The advertising campaign may be configured by an advertiser or some other advertising management entity (e.g., the depicted user 10). The advertiser or advertising management entity may provide the advertising campaign attributes 106 (also referred to as attributes 106) of the advertising campaign when the campaign is configured or an advertising campaign system may infer or automatically generate one or more advertising campaign attributes 106 based on advertising information provided by the advertiser/advertising management entity to the advertising campaign system. That is, the advertising campaign attributes 106 may be associated with a human-made advertising campaign or a computer generated advertising campaign. In some examples, a user (e.g., the user 10) who generates the voiceover request 102 is the same entity that coordinates (e.g., sets up) the advertising campaign (and the attributes 106). In other examples, an advertising campaign system may automatically generate the voiceover request. For instance, the advertising campaign system (e.g., in conjunction with the voiceover generator 140) is configured to detect when an advertisement associated with an advertising campaign lacks voiceover content and to provide the entity responsible for the advertising campaign with the option to generate synthesized voiceover speech. In some implementations, the advertising campaign system (e.g., the voiceover generator 140) automatically generates the synthesized voiceover speech 352 for a particular advertisement (e.g., an advertisement that lacks voiceover content) and recommends the synthesized voiceover speech that has been automatically generated to the entity responsible for the advertising campaign (e.g., the user 10).

The advertising campaign attributes 106 may include, but are not limited to, a headline, a call to action, a geographic region, a language, or an audience demographic. The headline may include a slogan or saying related to a brand (e.g., a company) or product of the target advertisement 104, such as "visit ABC123.com for a coupon" or "everyday performance apparel." The call to action may include an action for a target consumer of the advertisement to perform. An example of a call to action is "buy now," "download the app today," or "click on the link to learn more." The geographic region may include a target region for the advertising campaign, such as, a particular, country, state, city, or region. The language may include an intended language of the target advertisement 104. The audience demographic may include target consumer (i.e., target audience) of the target advertisement 104. For example, the audience demographic is males age 18-30 or women age 40-62. The audience demographic may provide key characteristics about the target consumer that advertising entity of the target advertisement 104 is trying to capture with the target advertisement 104. The advertising campaign attributes 106 may also include a landing page uniform resource locator (URL), a product type, and/or an industry associated with the content (e.g., the brand or the product) of the target advertisement 104.

In some implementations, the voiceover request 102 requests synthesized voiceover speech 352 that has speech characteristics 304 representative of the one or more advertising campaign attributes 106 of the target advertisement 104. The voiceover generator 140 may be configured to generate the synthesized voiceover speech 352 for the target advertisement 104 of the voiceover request 102 by executing on the remote system 130, the user device 110, or some combination thereof. More specifically, the voiceover generator 140 may include a script generator 200, a text-to-speech (TTS) system 300, and a speech overlay module 400. The script generator 200 is configured to generate a voiceover script 252 (i.e., a computer/machine-generated voiceover script 252) for the target advertisement 104. Here, when the script generator 200 generates the voiceover script 252, the voiceover script 252 may be entirely machine-generated with no human input during script generation. The voiceover script 252 includes a sequence of text for what will be spoken as synthesized voiceover speech during the target advertisement 104. In particular, the voiceover script 252 includes a textual representation of one or more words that will be spoken as synthesized voiceover speech during the target advertisement 104. In order to automatically generate a voiceover script 252 that relates to the target advertisement 104, the script generator 200 generates a sequence of text that is representative of (i.e., characterizes) the one or more advertising campaign attributes 106. That is, the script generator 200 generates the voiceover script 252 based on the one or more advertising campaign attributes 106 such that the voiceover script 252 relates to the target advertisement 104. Once the script generator 200 generates the voiceover script 252, the script generator 200 communicates the voiceover script 252 to the TTS system 300.

Figure 2A:
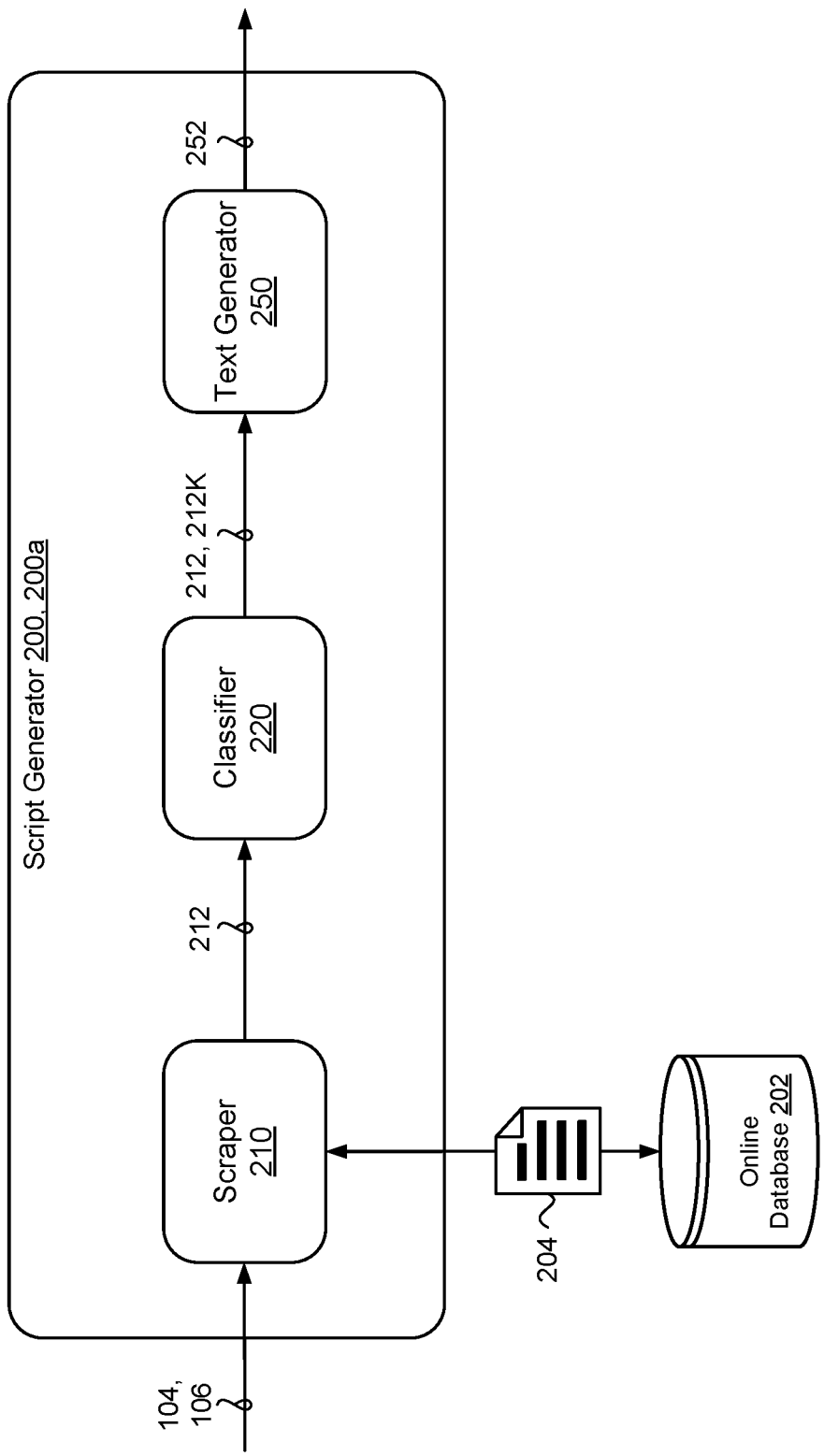
FIGS. 2A and 2B are schematic views of example script generators.
Figure 2B:
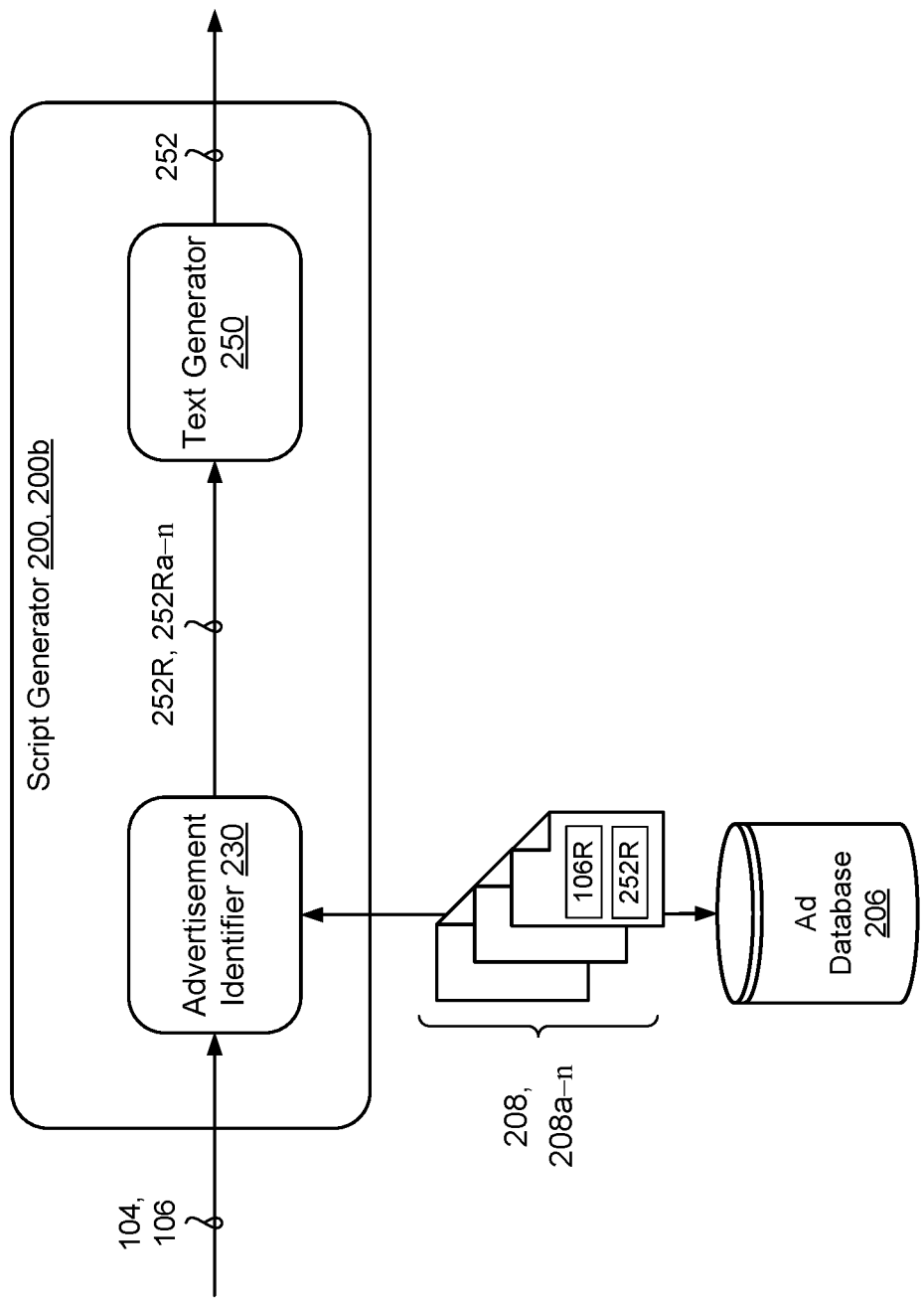

The script generator 200 may implement one or more language models for automatically generating the voiceover script 252 based on the one or more advertising campaign attributes 106. In some implementations, the script generator 200 includes one or more language models trained on captions of training voiceover speech extracted from a corpus of existing advertisements (e.g., training advertisements) 208, 208a-n (FIG. 2B). Notably, the captions serve as reference voiceover script 252R (FIG. 2B). In these implementations, the advertisements 208 in the corpus of advertisements may be associated with corresponding reference campaign attributes 106R (FIG. 2B) that may be further used to as labels for conditioning the language models during training.

The TTS system 300 is configured to convert the voiceover script 252 into corresponding synthesized voiceover speech 352 having speech characteristics 304 specified by a target TTS vertical 312 representative of the advertising campaign attributes 106. That is, the TTS system 300 determines how to say the voiceover script 252 based on the advertising campaign attributes 106 and/or voiceover script 252. The target TTS vertical 312 may convey a particular "character" for the voiceover speech 352 that best suits the target advertisement 104. Thus, the TTS system 300 may select the target TTS vertical 312 based on an advertisement type/vertical associated with the target advertisement 104. The TTS system 300 may use the advertisement campaign attributes 106 to identify the advertisement type/vertical and thereby select the appropriate target TTS vertical 312 associated therewith and that species corresponding speech characteristics 304. The speech characteristics 304 specified by the target TTS vertical 312 may include many linguistic factors that are not provided by text inputs in order to produce synthesized speech. A subset of these linguistic factors are collectively referred to as prosody and may include intonation (pitch variation), stress (stressed syllables vs. non-stressed syllables), and duration of sounds, loudness, tone, rhythm, and style of speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. The linguistic factors may also include accent, dialect, and/or language for a particular speaker of a geographical region. The TTS system 300 sends the synthesized voiceover speech 352 to the speech overlay module 400.

The speech overlay module 400 is configured to overlay the synthesized voiceover speech 352 generated by the TTS system 300 onto the target advertisement 104 to generate a voiceover advertisement 450. Here, the voiceover advertisement 450 includes the target advertisement 104 (i.e., audio advertisement or video advertisement) with the synthesized voiceover speech 352 in the target TTS vertical 312 representative of the advertising campaign attributes 106. When speech overlay module 400 overlays the synthesized voiceover speech 352 onto the target advertisement 104, the speech overlay module 400 may be configured to align the synthesized voiceover speech 352 with a particular portion or portions of the target advertisement 104. For example, synthesized voiceover speech 352 includes 10 seconds of speech and the target advertisement 104 may be 20 seconds long. Here, the speech overlay module 400 determines when the 10 seconds of synthesized voiceover speech 352 is spoken during the 20 seconds of the target advertisement 104. The voiceover generator 140 provides the voiceover advertisement 450 to an entity or system responsible for implementing the advertising campaign. For instance, as depicted in FIG. 1, the voiceover generator 140 communicates the voiceover advertisement 450 to the user 10 associated with the user device 110.

In some examples, the voiceover request 102 only includes the target advertisement 104 and one or more advertising campaign attributes 106. Therefore, the script generator 200 is configured to determine/generate the voiceover script 252 for conversion into corresponding synthesized voiceover speech 352 of the voiceover advertisement 450 based on the advertising campaign attributes 106. Referring now to FIG. 2A, in some implementations, an example script generator 200, 200a includes a scraper 210, a classifier 220, and a text generator 250. In some instances, the advertising campaign attributes 106 of the target advertisement 104 include a landing page uniform resource locator (URL) 204. The landing page URL 204 may be any webpage with content associated with the target advertisement 104 (e.g., content associated with a company, brand, or product of the target advertisement 104). For example, the target advertisement 104 is a video advertisement that includes a landing page URL 204 linked to the homepage of the company of the target advertisement 104, a webpage with detailed information of the product of the target advertisement 104, or any other webpage associated with the source, brand, and/or product of the target advertisement 104.

The script generator 200 may be in communication with an online database 202 to access the landing page URL 204 of the target advertisement 104. In particular, the scraper 210 receives the target advertisement 104 and the one or more advertising campaign attributes 106 and obtains the landing page URL 204 of the target advertisement 104 by accessing the online database 202. Once the scraper 210 obtains the landing page URL 204, the scraper 210 is configured to parse the content of the landing page URL 204 to identify phrases 212. That is, the landing page URL 204 includes various content, such as phrases, graphics, videos, links, etc., and the scraper 210 parses the content to identify the phrases 212 from among the other content included in the landing page URL 204. The identified phrases 212 may include a single word, one or more words, punctuation, symbols, and/or numbers. In some instances, because the landing page URL 204 is associated with the company, brand, and/or product of the target advertisement 104, the landing page URL 204 includes phrases that may be included in the voiceover script 252. In other words, the phrases from the landing page URL 204 may be candidate phrases to potentially include in the voiceover script 252.

For example, a target advertisement 104 for an athletic clothing company may include a landing page URL 204 linked to the athletic clothing company's homepage. The scraper 210 may access the online database 202 to obtain the landing page URL 204 of the athletic clothing company. Here, the scraper 210 parses the content of the landing page URL 204 and identifies one or more phrases 212 from the landing page URL 204 including "shop now," "terms of service," "20% off," "styles you need now," and "shipping information." The scraper 210 sends each of the identified phrases 212 to the classifier 220.

One or more of the identified phrases 212 identified by the scraper 210 may be relevant to the target advertisement 104, while other phrases 212 identified by the scraper 210 are not relevant to the target advertisement 104. As such, the script generator 200a only uses the identified key words that are relevant to the target advertisement 104 to generate the voiceover script 252. Accordingly, the classifier 220 is configured to classify which of the identified phrases 212 are key phrases 212, 212K for the target advertisement 104 based on the advertising campaign attributes 106 of the target advertisement 104. The classifier 220 determines whether the identified phrases 212 are key phrases 212K by ranking each of the identified phrases 212 from the landing page URL 204. Here, the rank for each of the identified phrases 212 corresponds to the likelihood that the identified phrase 212 relates to the advertising campaign attributes 106 of the target advertisement 104 (e.g., the likelihood the identified phrase 212 is a key phrase 212K).

Continuing with the above example, the classifier 220 ranks each of the identified phrases 212 "shop now," "terms of service," "20% off," "styles you need now," and "shipping information" received from the scraper 210 using the advertising campaign attributes 106 of the target advertisement 104. Here, the advertising campaign attributes 106 include clothing company, athletic, and an audience demographic of people between the age of 12 and 40. In this example, the classifier 220 may rank each of the identified phrases 212 from 0, indicating the lowest likelihood that the identified phrase 212 relates to the target advertisement 104, to 1, indicating the highest likelihood that the identified phrase 212 relates to the target advertisement 104. The classifier 220 ranks "shop now" with a 0.85 likelihood, "terms of service" with a 0.3 likelihood, "20% off" with a 0.75 likelihood, "styles you need now" with a 0.9 likelihood, and "shipping information" with a 0.35 likelihood. The classifier 220 determines from the advertising campaign attributes 106 that the target advertisement 104 relates to an advertisement for athletic clothing and that the identified phrases 212 "shop now," "styles you need now," and "20% off" have higher likelihood of relating to the target advertisement 104 than the identified phrases 212 "terms of service" and "shipping information."

In some implementations, the classifier 220 classifies the whether identified phrases 212 are key phrases 212K by determining whether a rank associated with each identified phrase 212 satisfies a threshold value. That is, the threshold value indicates a minimum rank (e.g., likelihood that the identified phrase 212 relates to the target advertisement 104) of the identified phrase 212 for the classifier 220 to classify the identified phrase 212 as a key phrase 212K. As such, the classifier 220 determines whether each of the identified phrases 212 is a key phrase 212K and sends each of the key phrases 212K to the text generator 250. In this example, the classifier 220 has threshold value of 0.7 and determines that "shop now," "20% off," and "styles you need now" are key phrases 212K. The classifier 220 then sends the key phrases 212K to the text generator 250.

The text generator 250 is configured to generate the voiceover script 252 using the one or more key phrases 212K received from the classifier 220. The text generator 250 may implement one or more language models to generate the voiceover script 252 using the one or more key phrases 212K. The one or more key phrases 212K may be "seed phrases" that the text generator 250 uses to generate a voiceover script 252. Here, the voiceover script 252 includes a sequence of text representative of the one or more advertising campaign attributes 106. The voiceover script 252 may include all of the words from the key phrases 212K, only a portion of the words from the key phrases 212K, or none of the words from the key phrases 212K. The text generator 250 generates the voiceover script 252 using the key phrases 212K and by generating additional words related to the key phrases 212K and/or the advertising campaign attributes 106. In particular, if the text generator 250 only generated the voiceover script 252 using the key phrases 212K, the voiceover script 252 may sound incomplete and choppy. Therefore, the text generator 250 generates additional words related to the key phrases 212K and the advertising campaign attributes 106 to generate a complete, coherent voiceover script 252.

Continuing with the example, the text generator 250 receives the key phrases 212K "shop now," "20% off," and "styles you need now," and generates the voiceover script 252 "Shop now for all of your athletic clothing styles and receive an additional 20% off." Here, if the text generator 250 simply used the key phrases 212K, the voiceover script 252 would be "shop now 20% off styles you need now," which would not be a coherent description for a target advertisement 104. Accordingly, the text generator 250 uses the key phrases 212K and advertising campaign attributes 106 to generate additional words for a complete voiceover script 252.

In some implementations, the classifier 220 determines that all of the ranks of the identified phrases 212 fail to satisfy the threshold value. Here, none of the identified phrases 212 may satisfy the threshold value because the target advertisement 104 does not include a landing page URL 204, the landing page URL does not include much text, and/or the landing page URL does not include text that is sufficiently related to the target advertisement 104 (e.g., related to the attributes 106 of the target advertisement 104). Here, the classifier 220 is unable to send the text generator 250 any key phrases 212K to generate a voiceover script 252. Notably, in these implementations, the script generator 200 must generate an entire voiceover script 252 using generation without the help of classification from "seed values" (e.g., key phrases 212K) classified by the classifier 220.

Accordingly, in some instances, the script generator 200 needs to generate the voiceover script 252 without using any key phrases 212K from the landing page URL 204. Referring now to FIG. 2B, in some implementations, an example script generator 200, 200b includes an ad database 206, an advertisement identifier 230, and the text generator 250. The ad database 206 includes a corpus of advertisements 208, 208a-n where each advertisement 208 is associated with a respective advertisement campaign that includes a reference voiceover script 252, 252R and a set of reference advertising campaign attributes 106, 106R. For instance, the ad database 206 corresponds to the YouTube ad database where a number of advertisements in the ad database each have a reference voiceover script 252R and a set of reference advertising campaign attributes 106R. The reference voiceover script 252R may correspond to captions of corresponding voiceover speech in each advertisement in the corpus of advertisements 208. In some examples, the an automated speech recognition (ASR) system performs speech recognition on the voice over speech to generate the caption that corresponds to the reference voiceover script 252R.

The script generator 200b is configured to determine a voiceover script 252 for the target advertisement 104 using the corpus of advertisements 208 obtained from the ad database 206. In particular, the advertisement identifier 230 identifies one or more advertisements 208 with reference advertising campaign attributes 106R similar to the advertising campaign attributes 106 of the target advertisement 104. The advertisement identifier 230 determines that the advertisements 208 that include reference advertising campaign attributes 106R similar to the advertising campaign attributes 106 of the target advertisement 104 likely have a reference voiceover script 252R that is representative of the target advertisement 104. The advertisement identifier 230 identifies advertisements 208 from the corpus of advertisements 208 as having similar reference advertising campaign attributes 106R to the one or more advertising campaign attributes of the target advertisement 104 using a similarity score. That is, the advertisement identifier 230 may assign a similarity score to each of the advertisements 208 that indicates a similarity between the advertising campaign attributes 106 of the target advertisement 104 and the reference advertising campaign attributes 106R for each advertisement 208 from the corpus of advertisements 208.

The advertisement identifier 230 may determine whether the similarity score of each advertisement 208 satisfies a similarity threshold. The similarity threshold may represent a minimum similarity required between the advertising campaign attributes 106 and the reference advertising campaign attributes 106R in order to use the reference voiceover script 252R to generate the voiceover script 252 of the target advertisement 104. When the similarity score of an advertisement 208 satisfies the similarity threshold, the advertisement identifier 230 sends the reference voiceover script 252R to the text generator 250. When the similarity score of an advertisement 208 fails to satisfy the similarity threshold, the advertisement identifier 230 does not send the reference voiceover script 252R to the text generator 250. The advertisement identifier 230 may send multiple reference voiceover scripts 252R, 252Ra-n when multiple similarity scores satisfy the similarity threshold.

Using the one or more reference voiceover scripts 252R, the text generator 250 generates the voiceover script 252 for the target advertisement 104. That is, the text generator 250 uses the reference voiceover scripts 252R from the already existing advertisements 208 with reference advertising campaign attributes 106R similar to the advertising campaign attributes 106 of the target advertisement 104 to generate a voiceover script 252 unique to the target advertisement 104.

As another additional implementation, and as discussed previously, the text generator 250 includes a language model trained on captions of training voiceover speech extracted from the corpus of advertisements 208. Here, each caption corresponds to corresponding reference voiceover script 252R. Likewise, the reference advertising campaign attributes 106R associated with each advertisement may be used to as labels for conditioning the language model during training. As such, the text generator 250 implementing the trained language model may be configured to receive advertising campaign attributes 106 as input, and generate, as output, the voiceover script 252.

Figure 3:
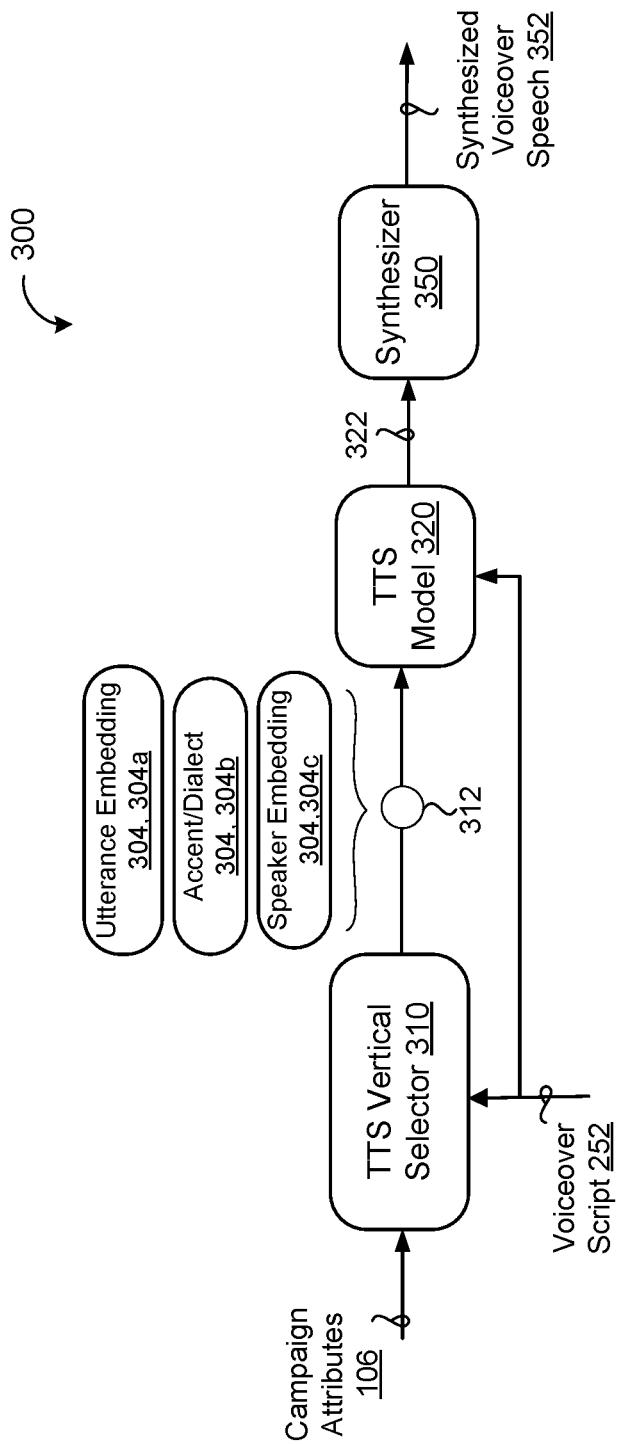
FIG. 3 is a schematic view of an example text to speech system.

Referring now to FIG. 3, in some implementations, the TTS system 300 includes a TTS vertical selector 310, a TTS model 320, and a synthesizer 350 for outputting respective synthesized speech 352 having an intended prosody/style specified by a unique set of speech characteristics 304. The TTS vertical selector 310 is configured to select, based on the one or more advertising campaign attributes 106 associated with the target advertisement 104, the target TTS vertical 312 that specifies the set of speech characteristics 304, for the resulting synthesized voiceover speech 352. Selection of the target TTS vertical 312 by the TTS vertical selector 310 may be further based on the voiceover script 252 output by the script generator 200.

As previously mentioned, the target TTS vertical 312 may convey a particular "character" for the voiceover speech 352 that best suits the target advertisement 104. Stated differently, the target TTS vertical 312 conveys a hypothetical voice actor that speaks with a speaking style/prosody typically associated with the advertisement type/vertical associated with the target advertisement. Thus, the TTS vertical selector 310 may select the target TTS vertical 312 based on an advertisement type/vertical associated with the target advertisement 104. The TTS system 300 may use the advertisement campaign attributes 106 to identify the advertisement type/vertical and thereby select the appropriate target TTS vertical 312 associated therewith and that species corresponding speech characteristics 304. For instance, advertisements in verticals related to technology, retail, consumer packaged goods may be associated with a "creator" TTS vertical 312 which specifies speech characteristics in a youthful voice and having an energetic and upbeat speaking style/prosody, while advertisements in verticals related to healthcare and finance may be associated with an "expert" TTS vertical 312 specifying characteristics in an adult voice and having an informative, direct, confident, and measured speaking style/prosody. As another example, advertisements in verticals related to automotive, consumer packaged goods, education and government, and media entertainment advertisements may be associated with an "announcer" TTS vertical 312 that specifies speech characteristics 304 in a low pitch, adult voice and having a speaking style/prosody indicative of a direct hard seller. Advertisements in beauty, fashion, travel, and wellness may additionally be associated with a luxury TTS vertical 312 that specifies speech characteristics 304 in a relaxed, smooth, and velvety speaking style/prosody.

The TTS vertical selector 310 may be a heuristic-based or neural network-based model that selects the target TTS vertical 312 based on the advertisement campaign attributes 106. That is, the TTS vertical selector 310 may learn from correlations between speech characteristics conveyed by voice actors that spoke voiceover speech in reference advertisements 208, the corresponding reference voiceover script 252R (e.g., captions of the voiceover speech), and advertisement types/verticals associated with the advertisements 208 in the corpus of reference advertisements 208.

As aforementioned, the speech characteristics 304 specified by the target TTS vertical 312 may include many linguistic factors that are not provided or conveyed by the voiceover script 252 (i.e., text input). A subset of these linguistic factors are collectively referred to as prosody and may include intonation (pitch variation), stress (stressed syllables vs. non-stressed syllables), and duration of sounds, loudness, tone, rhythm, and style of speech. Prosody may indicate the emotional state of the speech, the form of the speech (e.g., statement, question, command, etc.), the presence of irony or sarcasm of the speech, uncertainty in the knowledge of the speech, or other linguistic elements incapable of being encoded by grammar or vocabulary choice of the input text. The linguistic factors may also include accent, dialect, and/or language for a particular speaker of a geographical region.

The speech characteristics 304 specified by the target TTS vertical 312 may include at least one of an utterance embedding 304a, an accent/dialect identifier 304b, or a speaker embedding 304c. The utterance embedding 304a may include a latent variable specifying an intended prosody/style in order for the TTS model 320 to predict a synthesized speech representation 322 that conveys the intended prosody/style specified by the utterance embedding 304a. That is, the utterance embedding 304a may represent prosody/style information and/or accent/dialect information associated with the synthesized speech representation 322 the TTS model 320 aims to replicate. For example, the utterance embedding 304a may represent an energetic and upbeat speaking style/prosody for the "creator" TTS vertical 312, an informative, direct, confident, and measured speaking style/prosody for the "expert" TTS vertical 312, speaking style/prosody information conveying a direct hard seller for the "announcer" domain, and a relaxed, smooth, and velvety style/prosody for the "luxury" TTS vertical 312. Other TTS verticals 312 mapping to different speaking styles/prosodies are also envisioned.

The accent/dialect identifier 304b indicates a target accent/dialect for the resulting synthesized voiceover speech 352. For instance, the accent/dialect identifier 304b may identify the target of accent/dialect of British English or American English. In some examples, the accent/dialect identifier 304b identifies fine-grained dialects such as an American English Texan accent, an American English Midwestern accent, a British English South London Accent, a British English Manchester accent, etc. The accent/dialect identifier 304b may additionally serve as a language identifier when the TTS model 320 is multilingual, thereby conditioning the TTS model 320 to produce synthesized speech representations 322 in a multitude of languages different from the voiceover script 252.

The speaker embedding 304c may indicate voice characteristics of a target voice for the resulting synthesized voiceover speech 352. For instance, the speaker embedding 304c may indicate whether the target voice is male/female, child/adult, low/high pitch, etc. The speaker embedding 304c may convey a speaker identifier of a particular voice actor that spoke reference utterances used to train the TTS system 300. Accordingly, the TTS system 300 may use utterance embedding, accent/dialect identifier 304b, and speaker embedding 304c to clone the voice of the target speaker in the synthesized voiceover speech 352 across different accents/dialects and speaking styles/prosodies.

The TTS model 320 is configured to receive the speech characteristics 304 specified by the target TTS vertical 312 and convert the corresponding text of the voiceover script 252 into the synthesized speech representation 322. Thus, the synthesized speech representation 322 conveys the speaking style/prosody associated with the "character" represented by the TTS vertical 312. The speaker embedding 304c may condition the TTS model 320 to clone the voice of any particular target voice in the same speaking style/prosody associated with the "character" represented by the TTS vertical 312. Similarly, the accent/dialect identifier 304b may condition the TTS model 320 to produce the synthesized speech representation 322 in a variety of different accents/dialects and in the same speaking style/prosody. This scenario is particularly advantageous because it allows for voiceover speech to be generated across different accents/dialects associated with geographic regions the target advertisement 104 will be served. For example, voiceover script 252 for a new car lease advertising campaign could be used to generate synthesized voiceover speech 352 in a Midwestern accent for consumers viewing/listening to the target advertisement 104 in Michigan, and also to generate synthesized voiceover speech 352 in a Texan accent for consumers viewing/listening to the target advertisement 104 in Texas.

The synthesized speech representation 322 output by the TTS model 320 may include a sequence of mel-frequency spectrograms. In some examples, the TTS model 320 includes a variational autoencoder-based (VAE-based) TTS model having a decoder portion that is configured to decode the voiceover script 252 into a corresponding synthesized speech representation 322 including speech units (e.g., fixed-length frame (e.g., 5 milliseconds)) of pitch, energy and phoneme duration that convey prosodic/style information associated with the target TTS vertical 312 selected by the TTS vertical selector 310. Additional details of VAE-based TTS models are described with reference to U.S. patent application Ser. No. 16/867,427, filed on May 5, 2020, the contents of which are incorporated by reference in their entirety. The synthesized speech representation 322 may additionally or alternatively include vocoder parameters including mel-cepstrum coefficients (MCEPs), aperiodicity components, and voice components of each speech unit.

In the example shown, the TTS system 300 includes a single TTS model 320. Here, the TTS model 320 may be trained on the existing advertisements in the corpus of advertisements 208. Here, the advertisements 208 may span multiple advertisement type/verticals such that the voiceover speech spans the different speaking style/prosodies associated with these verticals. Additionally or alternatively, the TTS model 320 may be trained to learn how to synthesize speech that matches reference utterances of human speech spoken by different voice actors. For instance, a set of one or more voice actors may speak reference utterances from a reference voice over script 252R having a speaking style/prosody associated with the "announcer" TTS vertical and the TTS model 320 and TTS synthesizer 350 may learn to produce synthesized voice over speech 352 that matches the reference utterances. These reference utterances may be labeled with the associated TTS vertical. This process may be repeated by the same and/or different sets of voice actors to speaker reference utterances having speaking styles/prosodies associated with other TTS verticals, e.g., the "expert", "luxury", and/or "creator" verticals.

In additional implementations, the TTS system 300 includes multiple TTS models 320 each trained to produce synthesized speech representations having a different respective speaking style/prosody. For instance, the TTS system 300 may include a respective TTS model 320 for each target TTS vertical 312. Here, the appropriate TTS model 320 can be selected to convert the voiceover script 252 based on the target TTS vertical 312 selected by the TTS vertical selector 310. Similarly, the TTS system 300 may include multiple TTS models 320 each trained to produce synthesized speech representations in different voices and/or different accents/dialects. In one example, the voiceover script 252 in a first language can be translated/transliterated into a second language and provided to a TTS model 320 trained to produce synthesized speech in the second language.

The TTS synthesizer 350 is configured to receive, as input, the synthesized speech representation 322 output by the TTS model 320 and generate, as output, the synthesized voiceover speech 352 that conveys the unique set of speech characteristics 304 specified by the target TTS vertical 312. The TTS synthesizer 350 may include a vocoder network for converting a mel-frequency spectrogram sequence into a time-domain audio waveform. A time-domain audio waveform includes an audio waveform that defines an amplitude of an audio signal over time. The vocoder network can be any network that is configured to receive mel-frequency spectrograms and generate audio output samples based on the mel-frequency spectrograms. For example, the vocoder network can be, or can be based on the parallel feed-forward neural network described in van den Oord, *Parallel WaveNet: Fast High-Fidelity Speech Synthesis*, available at arxiv.org/pdf/1711.10433.pdf, and incorporated herein by reference. Alternatively, the TTS synthesizer 350 can be an autoregressive neural network. In some examples, the TTS synthesizer 350 converts fixed-length frames of pitch, energy, and phoneme duration represented by the synthesized speech representation 322 to produce the synthesized voiceover speech 352. For instance, a unit selection module or a WaveNet module may use the frames to produce the synthesized voiceover speech 352.

Figure 4A:
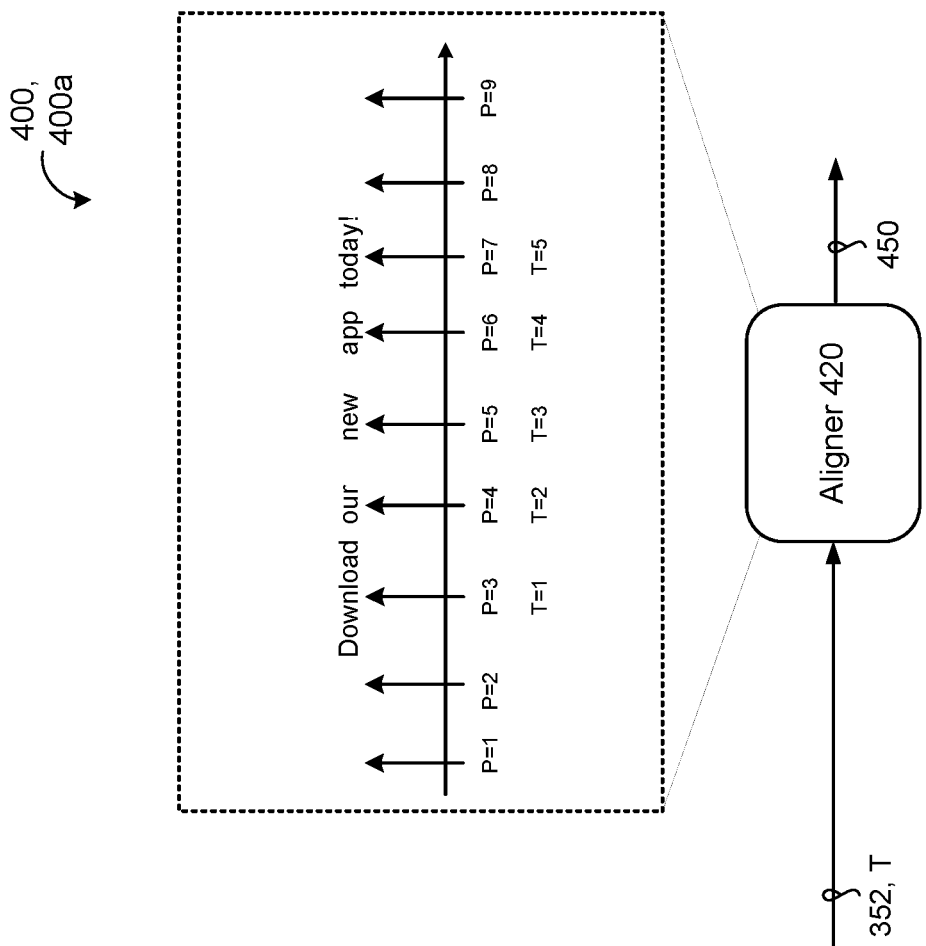
FIGS. 4A and 4B are schematic views of an example voice overlay module.
Figure 4B:
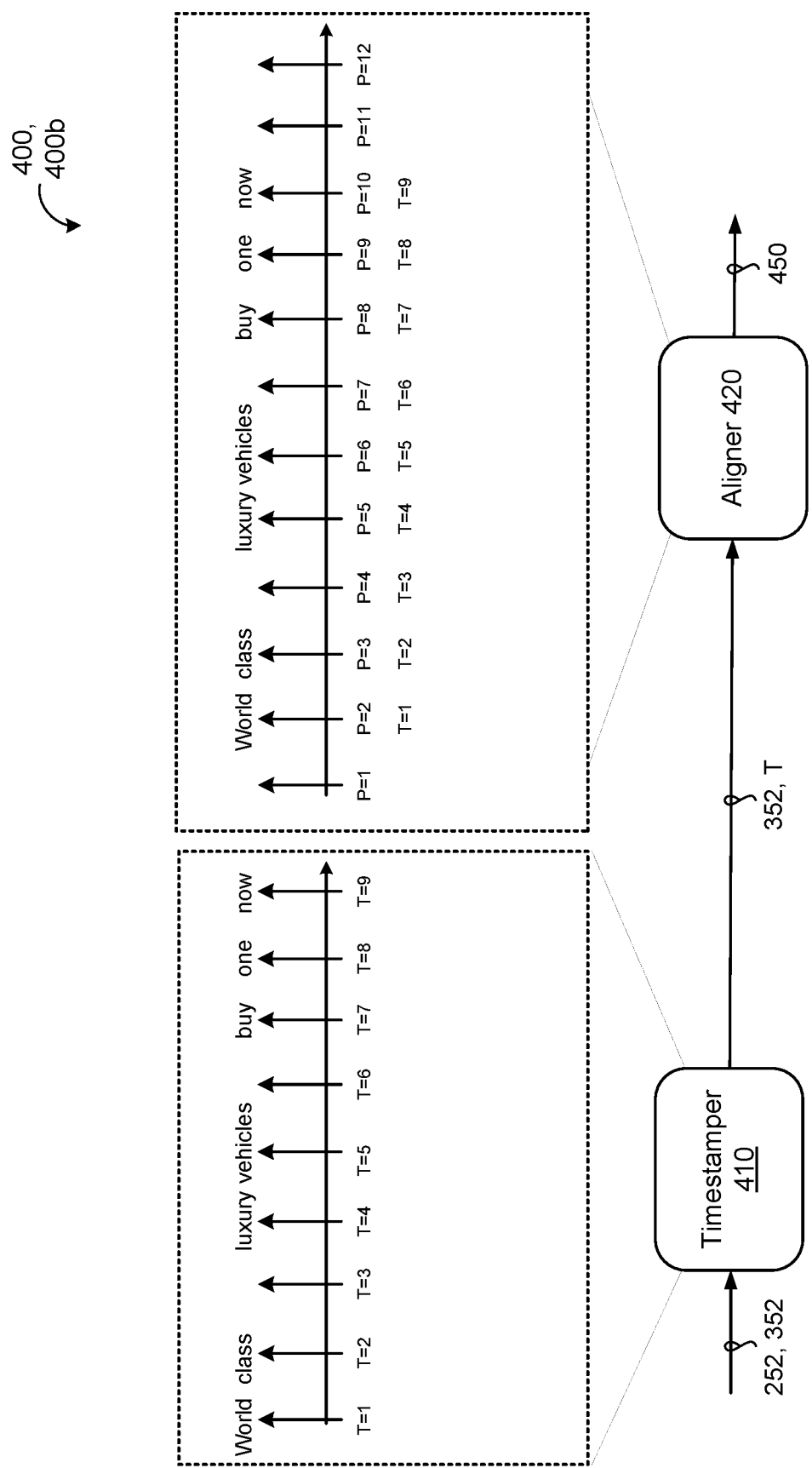

Referring now to FIGS. 4A and 4B, the speech overlay module 400 is configured to overlay the synthesized voiceover speech 352 on the target advertisement 104 to generate the voiceover advertisement 450. That is, the speech overlay module 400 determines when the one or more words of the voiceover script 252 should be spoken by the synthesized voiceover speech 352. In this respect, the speech overlay module 400 may align the synthesized voiceover speech 352 to a particular playtime during the duration of the target advertisement 104.

In some configurations, the speech overlay module 400 may include a timestamper 410 and an aligner 420. The timestamper 410 is configured to determine a respective timestamp T for a set of one or more words of the voiceover script 252. The timestamp T may represent a uniform unit of time (e.g., 1 second, 0.5 seconds, 5 seconds, etc.). The respective timestamp T for each of the one or more words determines a sequence (e.g., order) that the one or more words are spoken and/or a duration of how long the one or more words are spoken. The aligner 420 is configured to align the timestamps T of the one or more words of the voiceover script 252 with playtime timestamps P of the target advertisement 104. That is, the target advertisement 104 may include 9 seconds of playtime with each playtime timestamp P representing 1 second (i.e., P=9) and the timestamp T for the voiceover script 252 may include 5 seconds of speech with each timestamp representing 1 second (i.e., T=5). Here, the aligner 420 aligns the 5 seconds of voiceover script 252 with the 9 seconds of playtime of the target advertisement 104. For instance, the voiceover script 252 begins at on the third second of playtime for the target advertisement 104 and therefore end on the seventh second of playtime for the target advertisement 104.

Referring now to FIG. 4A, in some implementations, the timestamper 410 determines a respective timestamp T for a set of one or more words of the voiceover script 252. That is, the timestamper 410 determines the respective timestamp T for the start of the one or more words and the duration for which the one or more words are spoken. Here, the set of the one or more words does not include any pauses or silences in between any of the respective timesteps T. Therefore, the timestamper 410 only determines a respective timestamp T for the start of the set of the one or more words of the voiceover script 252 and a duration for how long the one or more words are spoken. For example, as shown in FIG. 4A, the timestamper 410 receives a set of one or more words of the voiceover script 252 and synthesized voiceover speech 352 corresponding to "Download our new app today!" Here, the timestamper 410 determines that the set of the one or more words starts at timestamper T=1 and the duration is for 5 timestamps T (e.g., 5 seconds). Accordingly, the set of one or more words starts at timestamp T=1 and ends at timestamp T=5 without any silences or pauses at any of the timestamps T in between T=1 and T=5. Notably, the timestamper 410 only determines one respective timestamp T for the set of one or more words rather than determining a timestamp T for each word of the one or more words. In other words, instead of having to generate a timestamp T for each word of a phrase, the timestamper 410 may generate a single timestamp T that can be used as a key timestamp to overlay the synthesized voiceover speech 352 on the target advertisement 104. Here, the key timestamp may be a beginning, midpoint, or end of a segment of synthesized voiceover speech 352 and the aligner 420 uses only the key timestamp to overlay the synthesized voiceover speech 352 on the target advertisement 104 at the desired time. For example, the timestamper 410 determines that the timestamp T for the midpoint, the word "new" and the aligner 420 aligns the word "new" at the midpoint of the playtime duration of the target advertisement 104 (e.g., at five seconds).

The aligner 420 receives the synthesized voiceover speech 352 and the associated timestamps T from the timestamper 410. As shown in FIG. 4A, the playback time of the target advertisement 104 is 9 seconds with each playback timestep P equal to 1 second (i.e., P=9). The aligner 420 aligns the synthesized voiceover speech 352 to the playback timesteps P using the respective timesteps T. The aligner 420 determines that the synthesized voiceover speech 352 starts at P=3 and ends at P=7. Thus, the aligner 420 aligns the respective timestamps T=1 to T=5 of the synthesized voiceover speech 352 to the playback timesteps P=3 to P=7. After the aligner 420 aligns the synthesized voiceover speech 352 to the target advertisement 104, the speech overlay module 400 generates the voiceover advertisement 450.

In some instances, the speech overlay module 400 is able to control the cadence (e.g., timing) of each spoken word of the synthesized voiceover speech 352 independently. That is, the synthesized voiceover speech 352 may not be spoken sequentially and may include one or more pauses or silences in between words. Referring now to FIG. 4B, in some implementations, the timestamper 410 determines a respective timestamp T for each of the one or more words of the voiceover script 252 individually. That is, there may be blank spaces between one or more words from the voiceover script 252. As illustrated in FIG. 4B, the timestamper 410 receives the synthesized voiceover speech 352 and the voiceover script 252 corresponding to "World class luxury vehicles buy one today." The timestamper 410 determines a respective time stamp T for each of the one or more words individually. For example, the timestamper may determine that there should be a pause between the words "World class," "luxury," "vehicles," and "buy one now." Accordingly, the timestamper 410 determines a timestamp of T=1 for "World," T=2 for "class," T=4 for "luxury," and T=6 for "vehicles," T=8 for "buy," T=9 for "one," and T=10 for "now." Then timestamper 410 also determines there should be a pause or silence at timestamp T=3 and T=6.

The timestamper 410 sends the synthesized voiceover speech 352 and the corresponding timestamps T to the aligner 420. The aligner 420 is configured to align the timestamps T of the one or more words of the synthesized voiceover speech 352 to the playtime P of the target advertisement 104. That is, the aligner 420 determines when the synthesized voiceover speech 352 is spoken during the playtime of the target advertisement 104. In some examples, the aligner 420 aligns when the synthesized voiceover speech 352 starts and ends, but does not add or remove any silences or pauses between the one or more words of the synthesized voiceover speech 352 other than what the aligner 420 receives as communication from the timestamper 410. For example, the timestamper 410 determined there is a timestamp of silence between "class" and "luxury" at timestamp T=3. Here, the aligner 420 may not add or remove silences between "class" and "luxury." Thus, the aligner 420 determines where the synthesized voiceover speech 352 is spoken, but does not influence the cadence (e.g., timing) of the synthesized speech as determined by the timestamper.

For example, the aligner 420 aligns the 9 timestamps T from the timestamper to the 12 playtime timestamps P of the target advertisement 104. The aligner 420 determines that the first time stamp T=1 aligns to the second playtime timestamp P=2 and that the last timestamp T=9 aligns to the tenth playtime timestamp P=10. Here, the aligner 420 aligns where the synthesized voiceover speech 352 is spoken during the playtime of the target advertisement 104 (e.g., start at playtime timestamp P=2 and end at playtime timestamp P=10) without influencing the cadence of the synthesized voiceover speech 352 set by the timestamper 410. After the aligner 420 aligns the synthesized voiceover speech 352 to the playtime of the target advertisement 104, the speech overlay module 400 generates the voiceover advertisement 450 in response to the voiceover request 102. For instance, the speech overlay module 400 or the voiceover generator 140 communicates the voiceover advertisement 450 to the user 10 associated with the voiceover request 102.

Figure 5:
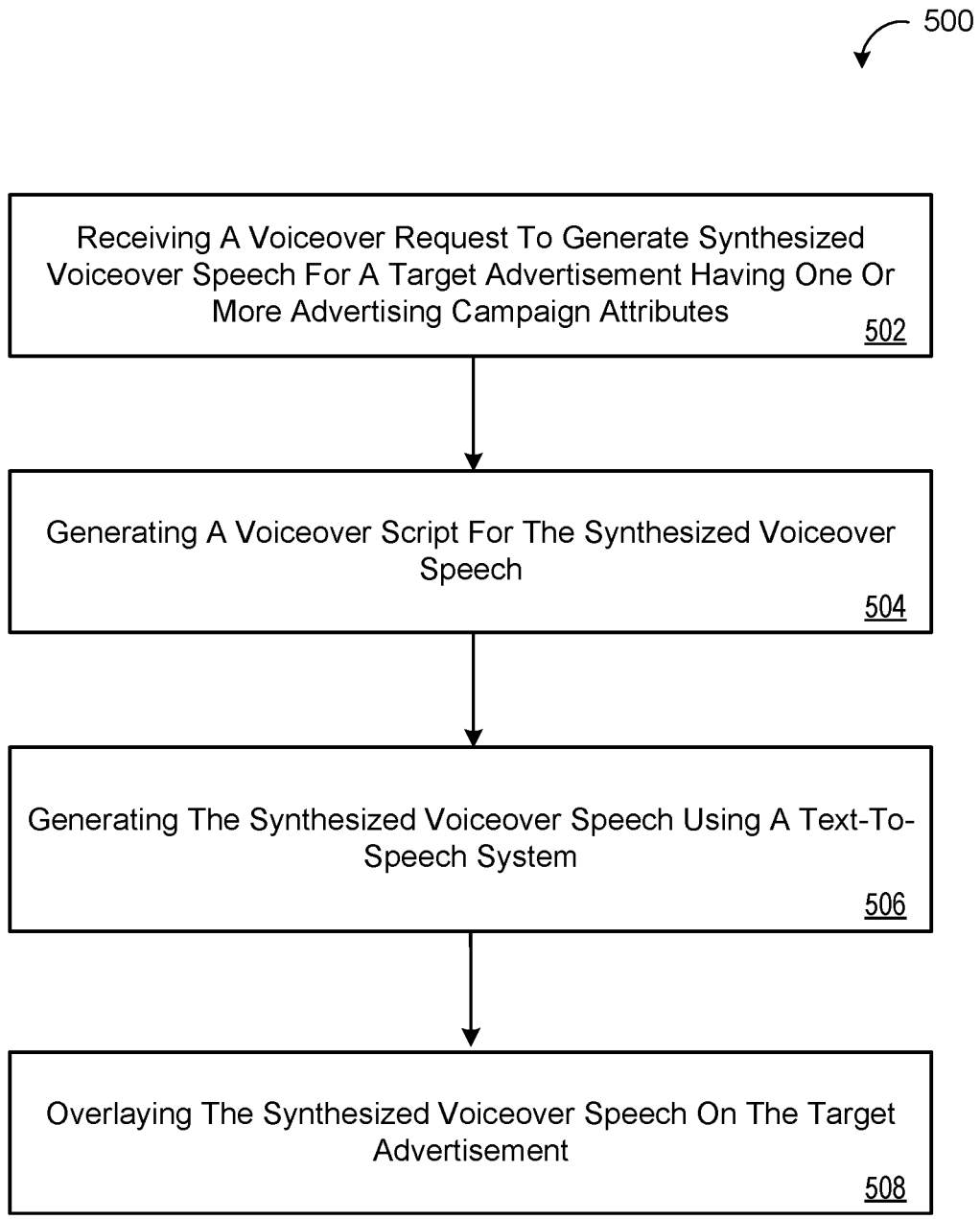
FIG. 5 is a flowchart of an example arrangement of operations for a method of performing automatic voiceover generation.

FIG. 5 is a flowchart of an exemplary arrangement of operations for a method 500 of performing automatic voiceover generation. At operation 502, the method 500 includes receiving a voiceover request 102 to generate synthesized voiceover speech 352 for a target advertisement 104 having one or more advertising campaign attributes 106. At operation 504, the method 500 includes generating, based on the one or more advertising campaign attributes, a voiceover script 252 for the synthesized voiceover speech 352 that includes a sequence of text. At operation 506, the method 500 includes generating the synthesized voiceover speech 352 using a text-to-speech (TTS) system 300. The TTS system 300 is configured to receive, as input, the sequence of text for the voiceover script 252 and generate, as output, the synthesized voiceover speech having speech characteristics specified by a target TTS vertical 312. At operation 508, the method 500 includes overlaying the synthesized voiceover speech 352 on the target advertisement 104.

Figure 6:
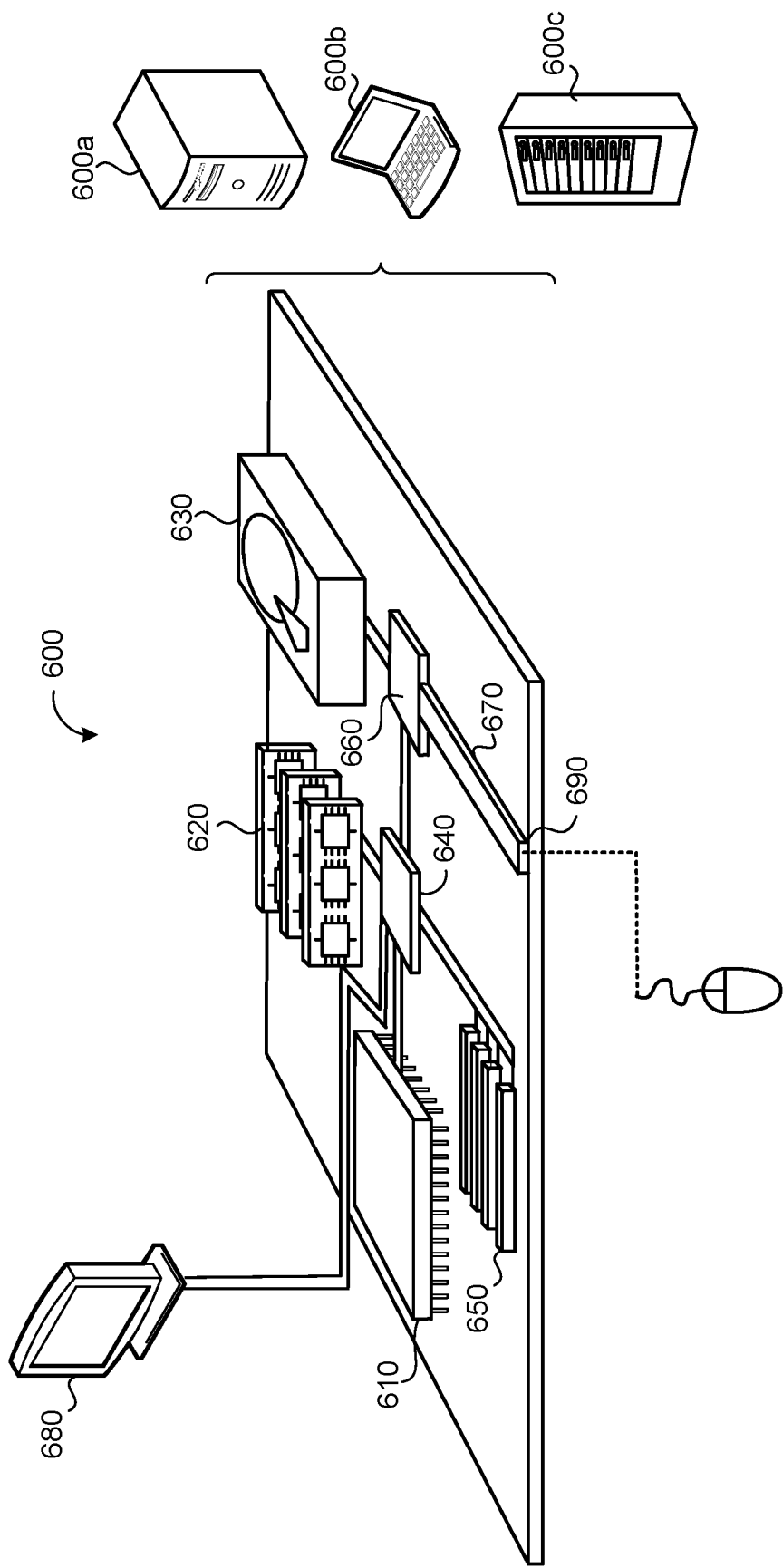
FIG. 6 is a schematic view of an example computing device that may be used to implement the systems and methods described herein.

FIG. 6 is schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed on data processing hardware causes the data processing hardware to perform operations comprising:
   receiving a voiceover request to generate synthesized voiceover speech for a target advertisement having one or more advertising campaign attributes;
   generating, based on the one or more advertising campaign attributes, a voiceover script for the synthesized voiceover speech, the voiceover script comprising a sequence of text comprising one or more words;
   generating, using a text-to-speech (TTS) system, the synthesized voiceover speech, the TTS system configured to:
      receive, as input, the sequence of text for the voiceover script;
      select, using a neural network model, a target TTS vertical for the synthesized voiceover speech based on the one or more advertising campaign attributes, the selected target TTS vertical comprising an embedding specifying speech characteristics not conveyed by the voiceover script; and
      generate, as output, the synthesized voiceover speech using the embedding of the selected target TTS vertical, the synthesized voiceover speech having the speech characteristics specified by the selected target TTS vertical; and
   overlaying the synthesized voiceover speech on the target advertisement by, for each respective word of the one or more words, determining a corresponding timestamp where the respective word should be spoken by the synthesized voiceover speech during the target advertisement, the corresponding timestamp for the respective word determined independently from each other word of the one or more words.

2. The computer-implemented method of claim 1, wherein the speech characteristics specified by the embedding of the selected target TTS vertical comprise at least one of an utterance embedding specifying prosody/style information conveyed by the synthesized voiceover speech, an accent/dialect identifier specifying an accent/dialect conveyed by the synthesized voiceover speech, and a speaker embedding specifying voice characteristics of the synthesized voiceover speech.

3. The computer-implemented method of claim 1, wherein the advertising campaign attributes comprise at least one of:
   a headline;
   a call to action;
   a geographic region;
   a language; or
   an audience demographic.

4. The computer-implemented method of claim 1, wherein:
   the target advertisement comprises a playtime comprising each corresponding timestamp determined for the one or more words; and
   overlaying the synthesized voiceover speech comprises aligning each corresponding timestamp determined for the one or more words with the playtime of the target advertisement.

5. The computer-implemented method of claim 1, wherein generating the voiceover script for the synthesized voiceover speech comprises identifying one or more words related to an advertisement campaign having the one or more advertising campaign attributes by:
   identifying phrases from a landing page uniform resource locator (URL) associated with the advertising campaign; and
   ranking each of the phrases identified from the landing page URL, the rank for each of the phrases corresponding to a likelihood that the respective phrase relates to the one or more advertisement campaign attributes of the advertising campaign.

6. The computer-implemented method of claim 5, wherein the operations further comprise determining whether the rank of any identified phrases satisfies a threshold value.

7. The computer-implemented method of claim 6, wherein:
   generating the voiceover script occurs when the rank of one of the identified phrases satisfies the threshold value; and the sequence of text of the voiceover script represents the identified phrase that satisfies the threshold value.

8. The computer-implemented method of claim 6, wherein, the operations further comprise, in response to determining the rank of the identified phrases fail to satisfy the threshold value:
  accessing a corpus of advertisements associated with different advertising campaigns, each advertisement associated with a respective advertisement campaign having a respective voiceover script and a set of advertising campaign attributes;
  identifying one or more advertisements from the corpus of advertisements having advertising campaign attributes similar to the one or more advertising campaign attributes of the voiceover request; and
  generating the voiceover script for the synthesized voiceover speech based on the respective voiceover script of the identified one or more advertisements having advertisement campaign attributes similar to the one or more advertising campaign attributes of the voiceover request.

9. The computer-implemented method of claim 1, wherein the TTS system comprises:
  a TTS model configured to convert the sequence of text for the voiceover script into a corresponding synthesized speech representation of the voiceover script; and
  a TTS synthesizer configured to generate the synthesized voiceover speech from the synthesized speech representation output from the TTS model.

10. The computer-implemented method of claim 1, wherein the one or more advertising campaign attributes are associated with a human-made advertising campaign.

11. A system comprising:
  data processing hardware; and
  memory hardware in communication with the data processing hardware, the memory hardware storing instructions that when executed by the data processing hardware cause the data processing hardware to perform operations comprising:
    receiving a voiceover request to generate synthesized voiceover speech for a target advertisement having one or more advertising campaign attributes;
    generating, based on the one or more advertising campaign attributes, a voiceover script for the synthesized voiceover speech, the voiceover script comprising a sequence of text comprising one or more words;
    generating, using a text-to-speech (TTS) system, the synthesized voiceover speech, the TTS system configured to:
      receive, as input, the sequence of text for the voiceover script;
      select, using a neural network model, a target TTS vertical for the synthesized voiceover speech based on the one or more advertising campaign attributes, the selected target TTS vertical comprising an embedding specifying speech characteristics not conveyed by the voiceover script; and
      generate, as output, the synthesized voiceover speech using the embedding of the selected target TTS vertical, the synthesized voiceover speech having the speech characteristics specified by the selected target TTS vertical; and
    overlaying the synthesized voiceover speech on the target advertisement by, for each respective word of the one or more words, determining a corresponding timestamp where the respective words should be spoken by the synthesized voiceover speech during the target advertisement, the corresponding timestamp for the respective word determined independently from each other word of the one or more words.

12. The systems of claim 11, wherein the speech characteristics specified by the embedding of the selected target TTS vertical comprise at least one of an utterance embedding specifying prosody/style information conveyed by the synthesized voiceover speech, an accent/dialect identifier specifying an accent/dialect conveyed by the synthesized voiceover speech, and a speaker embedding specifying voice characteristics of the synthesized voiceover speech.

13. The system of claim 11, wherein the advertising campaign attributes comprise at least one of:
  a headline;
  a call to action;
  a geographic region;
  a language; or
  an audience demographic.

14. The system of claim 11, wherein:
  the target advertisement comprises a playtime comprising each corresponding timestamp determined for the one or more words; and
  overlaying the synthesized voiceover speech comprises aligning each corresponding timestamp determined for the one or more words with the playtime of the target advertisement.

15. The system of claim 11, wherein generating the voiceover script for the synthesized voiceover speech comprises identifying one or more words related to an advertisement campaign having the one or more advertising campaign attributes by:
  identifying phrases from a landing page uniform resource locator (URL) associated with the advertising campaign; and
  ranking each of the phrases identified from the landing page URL, the rank for each of the phrases corresponding to a likelihood that the respective phrase relates to the one or more advertisement campaign attributes of the advertising campaign.

16. The system of claim 15, wherein the operations further comprise determining whether the rank of any identified phrases satisfies a threshold value.

17. The system of claim 16, wherein:
  generating the voiceover script occurs when the rank of one of the identified phrases satisfies the threshold value; and
  the sequence of text of the voiceover script represents the identified phrase that satisfies the threshold value.

18. The system of claim 16, wherein, the operations further comprise, in response to determining the rank of the identified phrases fail to satisfy the threshold value:
  accessing a corpus of advertisements associated with different advertising campaigns, each advertisement associated with a respective advertisement campaign having a respective voiceover script and a set of advertising campaign attributes;
  identifying one or more advertisements from the corpus of advertisements having advertising campaign attributes similar to the one or more advertising campaign attributes of the voiceover request; and
  generating the voiceover script for the synthesized voiceover speech based on the respective voiceover script of the identified one or more advertisements having advertisement campaign attributes similar to the one or more advertising campaign attributes of the voiceover request.

19. The system of claim 11, wherein the TTS system comprises:
 a TTS model configured to convert the sequence of text for the voiceover script into a corresponding synthesized speech representation of the voiceover script; and
 a TTS synthesizer configured to generate the synthesized voiceover speech from the synthesized speech representation output from the TTS model.

20. The system of claim 11, wherein the one or more advertising campaign attributes are associated with a human-made advertising campaign.

* * * * *